United States Patent [19]

Cargould et al.

[11] Patent Number: 4,852,398

[45] Date of Patent: Aug. 1, 1989

[54] TIRE TESTING MACHINE HAVING ADJUSTABLE BEAD WIDTH

[75] Inventors: Barry D. Cargould, Akron; James C. Beebe, Kent, both of Ohio

[73] Assignee: Eagle-Picher Industries, Inc., Cincinnati, Ohio

[21] Appl. No.: 165,814

[22] Filed: Mar. 9, 1988

[51] Int. Cl.⁴ .......................................... G01M 17/02
[52] U.S. Cl. ......................................................... 73/146
[58] Field of Search .................................................. 73/146

[56] References Cited

U.S. PATENT DOCUMENTS

| | | | |
|---|---|---|---|
| 3,552,200 | 1/1971 | Hermanns et al. | 73/146 |
| 3,656,343 | 4/1972 | Braden et al. | 73/146 |
| 3,674,067 | 7/1972 | Cooper | 73/146 |
| 3,698,233 | 10/1972 | Braden et al. | 73/146 |
| 4,004,693 | 1/1977 | Tsuji et al. | 73/146 |
| 4,023,407 | 5/1977 | Vanderzee | 73/146 |
| 4,051,733 | 10/1977 | Tomkin | 73/146 |
| 4,380,927 | 4/1983 | Oda et al. | 73/146 |
| 4,491,013 | 1/1985 | Bubik | 73/146 |
| 4,663,889 | 5/1987 | Strand et al. | 73/146 |
| 4,677,848 | 7/1987 | Flory | 73/146 |
| 4,704,900 | 11/1987 | Beebe | 73/146 |

FOREIGN PATENT DOCUMENTS 1264045 3/1968 Fed. Rep. of Germany .
1283501 11/1968 Fed. Rep. of Germany .
2233319 7/1971 Fed. Rep. of Germany .
2424668 12/1975 Fed. Rep. of Germany .
880745 10/1961 United Kingdom .

OTHER PUBLICATIONS

Patent Abstracts of Japan, vol. 11, No. 378 (P-645) (2825), Dec. 10, 1987, Bridgestone Corp.
Hofmann News, "Machines and Equipment for the Wheel and Tire Industry", pp. 3,4,5 and cover.
Hofmann Report 89, "Automatic Tire Uniformity Grading Machine for Car and Light-Truck Tires Type RGM-E", 8 sheets.

*Primary Examiner*—Donald O. Woodiel
*Attorney, Agent, or Firm*—Wood, Herron & Evans

[57] ABSTRACT

A tire testing machine having a rotatably but actuatably fixed upper rim, a rotatable lower rim assembly and a hydraulic cylinder for raising and lowering the lower rim to a desired position. The lower rim assembly has a resiliently-biased center pilot in the form of a cone that is engageable with a recess in the upper rim to center the lower rim with respect to the upper rim and to transmit rotational forces from the upper rim to the lower rim. The centering action of the pilot is assisted by a pair of mating spherical washers associated with the lower rim assembly.

16 Claims, 2 Drawing Sheets

TIRE TESTING MACHINE HAVING ADJUSTABLE BEAD WIDTH

FIELD OF THE INVENTION

This invention relates to tire testing. More particularly, the invention relates to an apparatus and method for chucking a tire in a test machine such as a tire uniformity testing machine to accommodate tires of differing bead widths.

BACKGROUND OF THE INVENTION

While the present invention may find application in a wide variety of tire testing apparatus wherein it is necessary to rapidly chuck tires it is applicable to great advantage in tire uniformity testing machines. Tire uniformity testing machines commonly include an upper rim, a vertically-movable lower rim, and a conveyor to bring a tire between the upper and lower rims. A mechanism is provided to raise the lower rim through an opening in the conveyor, carrying a tire with it, to the upper rim where the tire is inflated. The lower rim carries a center cone that is engagable with a center recess in the upper rim, the cone precisely positioning the upper rim with respect to the lower rim so that the separation between the two is at the desired bead width for the tire being tested. A motor is connected to the upper rim to rotate it at a predetermined test speed. A load wheel or road wheel, rotatable on an axis parallel to the axis of the tire, is movable into engagement with the tire tread so as to load the tire as it rotates in a manner simulating a road condition.

A hydraulic actuator is connected to the lower rim to raise and lower it. This actuator must be capable of applying a force sufficient to overcome the separation force of tens of thousands of pounds acting on the rims when the tire is inflated. The force applied by the actuator must also be sufficiently great to hold the cone against the recess of the upper rim with sufficient pressure to driveably couple the upper and lower rims so that the rotational force applied to the upper rim is transmitted to the lower rim through the center cone rather than through the tire substantially without slip which might otherwise distort the tire and possibly affect test results.

The problem that the existing machines present is the need to quickly change the machine over to accommodate tires of different bead widths. The bead width is the spacing between the two opposed beads by which the tire is seated on the respective rim halves when the tire is properly mounted. With modern tire production practices one may no longer rely on being able to test a relatively large batch of tires of a given bead width. To the contrary, tires presented to the testing machine conveyor often now have different bead widths from one tire to the next.

The practice prior to the present invention has been to adjust bead width by removing the cone from a socket in the lower rim assembly and to replace it with one of a different length as to create a different bead width when the new cone is in engagement with the conical seat of the of upper rim. Such a system is costly and inefficient because it requires stopping the machine for manual changeover each time a tire with a different bead width is presented for testing. It also requires an operator to reach into the machine to perform the spindle change.

Another significant problem inherent in the prior art is that of insuring proper seating of the tire bead on the rim during inflation. When the lower rim engages the tire, gravity normally insures close engagement of the lower bead with the lower rim. However, when the nose cone of the lower rim bottoms out in the socket of the upper rim, a significant gap often remains between the upper bead of the tire and the upper rim due to the natural tendency of the tire to sag under the force of gravity in its uninflated condition. This problem is most apparent in the case of tires having wide bead widths where the gap between the top rim and the top bead is generally larger. The system relies on the inrush of a large flow of inflation air to pressurize the interior of tee tire sufficiently to overcome this sag to lift the bead into engagement with the rim to seat upon it. Often, this does not occur properly.

SUMMARY OF THE INVENTION

In view of the foregoing, it is an objective of the present invention to provide an apparatus and method for changing the bead width quickly and easily without a physical substitution of different spacing elements. This objective of the present invention is attained by providing a mechanism for raising and lowering the lower rim to the precise predetermined spacing for a desired bead width. The invention also provides a centering cone that is spring-loaded to urge it upwardly against the upper rim to apply to the upper rim a force of at least about 400 pounds to make the driving connection between the upper and lower rims. The cone is slideable with respect to the lower rim but is rotatably fixed with respect to the lower rim.

It is a further objective of the invention to provide an apparatus and method which improves the reliability of bead seating even with tires having wider bead widths. In accordance with the present invention, the sequence of motions between the lower rim and the upper rim are the following:

The lower rim is first raised, with a tire between it and the upper rim, until the cone, seated in the upper rim, bottoms out on the lower rim and forms a solid connection between the lower rim, cone and upper rim. In bottoming out, the nose cone, which is regularly exposed to dirt, pulverizes the dirt and in conjunction with other means to be described provides assurance of proper centering as well as maintaining of the desired parallel relationship between the upper and lower rims.

In the "solid" position, the tire is inflation of the tire commenced. Because the rims are closer to each other than normal, the gap between the bead and rim is reduced. Thus, there is increased assurance of immediate and effective seating of the beads on the rims. This is true even for very large bead widths.

With the tire inflated, the piston and cylinder lowers the lower rim until the required bead width for the tire being tested is attained. In this position, the hydraulic force applied by the hydraulic cylinder just balances the separating forces acting on the rims which include the pneumatic force imposed by the inflated tire plus the spring pressure of 400–500 pounds exerted by the nose cone against its socket to insure a substantially rotatably slipless driving connection between the upper rim and the lower rim.

The invention contemplates the use of a position sensing device such as a linear variable differential transformer (LVDT) connected between the machine frame and the lower rim housing so that the position of the lower rim with respect to the upper rim can be precisely measured. A hydraulic servo system compares the information from the LVDT with an applied set point signal to drive a hydraulic actuator to vertically position of the lower rim to achieve and maintain a separation between the rims corresponding to a bead width determined by the set point signal.

In the preferred embodiment, a helical spring is disposed between the cone and the lower rim spindle housing. Because of the forces involved, the helical spring, when compressed, tends to twist and abrades its seats. To eliminate the abrasion, the lower end is seated in a thrust bearing mounted in the spindle. To insure proper axial centering and maintain parallelism of the upper and lower rims when they are engaged, mating concave and convex spherical washers are interposed between the hydraulic actuator and the nose cone to permit the nose cone to center accurately in its socket in the upper rim.

BRIEF DESCRIPTION OF THE INVENTION

The several features of the invention will become more readily apparent when taken in conjunction with the accompanying drawings in which:

FIG. 1 is a diagrammatic side elevational view of the tire testing machine incorporating a preferred embodiment of apparatus the invention; and FIG. 2 is a vertical cross-sectional view through the axis of the apparatus of FIG. 1.

DETAILED DESCRIPTION OF THE INVENTION

Figure 1:
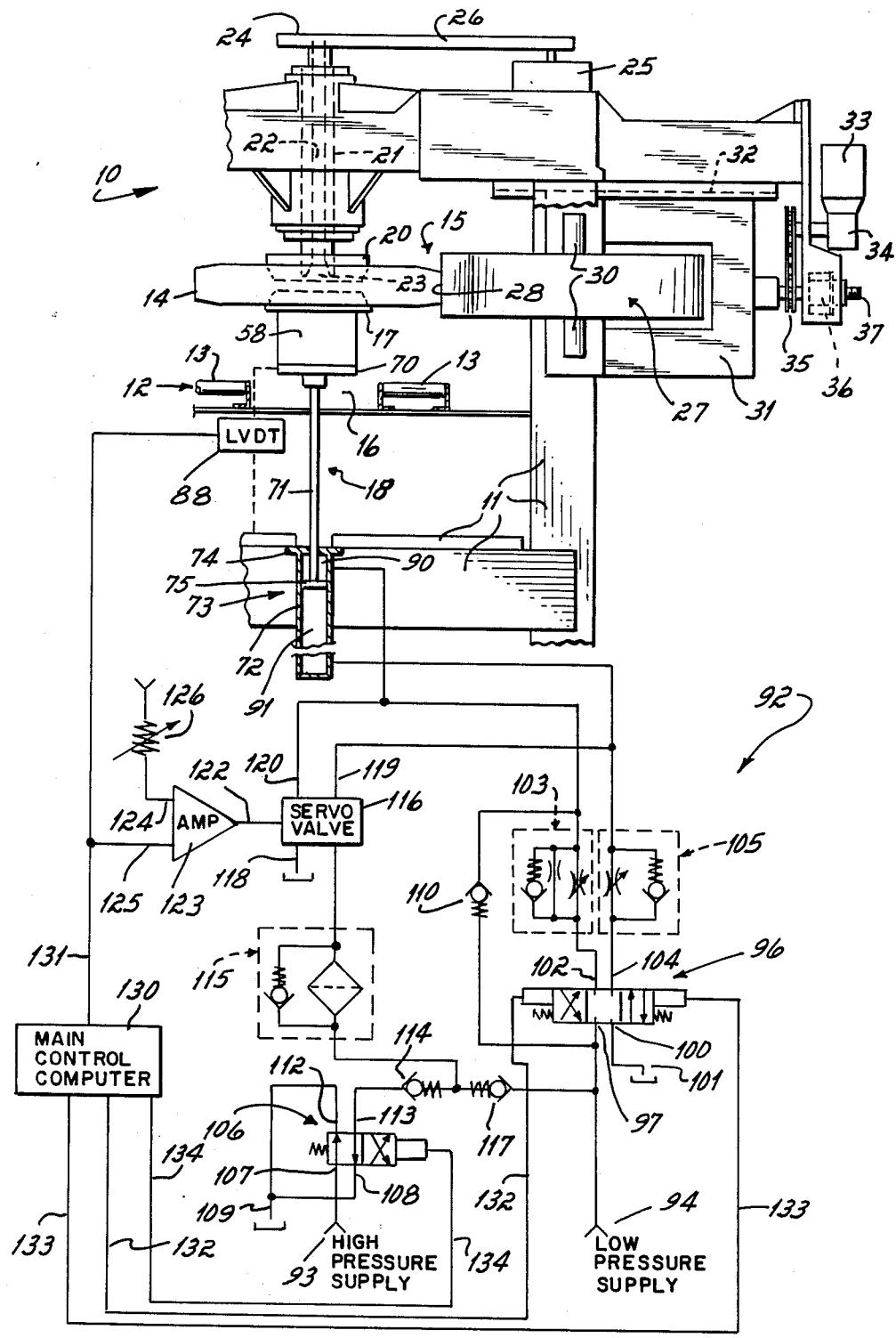

As shown, a tire uniformity inspection machine 10 incorporating the invention includes a frame 11 which supports a conveyor 12 having a plurality of rollers 13 for delivering a tire 14 to be inspected to a test station 15. Conveyor 12, is described in detail in copending, commonly, assigned U.S. patent application Ser. No. 07/162,218, filed 2/29/88, expressly incorporated by reference herein in its entirety. Conveyor 12 includes an opening 16 which is small enough to prevent a tire from falling through but large enough to pass a lower rim 17 which is rotatably mounted upon a vertically-retractable lower rim assembly 18. An upper rim 20 is rotatably mounted by means of an upper rim spindle 21 to the upper portion of frame 11. Upper rim 20 is disposed opposite lower rim 17 so that upper and lower rims 20 and 17 cooperate to function as a rim to support a tire 14 under test when lower rim 17 is in its extended position as shown in FIG. 1 and in phantom view in FIG. 2. Upper rim spindle 21 includes an axial air passage 22 which communicates with an orifice 23 in upper rim 20 to permit inflation of tire 14.

In order to rotate a tire under test, upper rim spindle 21 is fitted with a drive pulley 24 connected to a drive motor 25 by way of a timing belt 26.

A loadwheel 27 having a circumferential surface 28 is supported by loadwheel spindles 30 for free rotation about an axis parallel to that of the tire 14 under test. Loadwheel spindles 30 are in turn supported by a carriage 31 which is slideably secured to frame 11 by one or more ways 32 so as to be movable in the radial direction, toward and away from tire 14. As carriage 31 urges loadwheel 27 radially inward (to the left in FIG. 1) against tire 14, the radial load on tire 14 increases. Likewise, movement of carriage 31 radially outward (to the right in FIG. 1) reduces the radial force on tire 14. Carriage 31 is moved back and forth by a reversible D.C. motor 33 secured to frame 11. Motor 33 drives a gear box 34 whose output drives a chain and sprocket linkage 35 to rotate a ball screw rotation only female screw 36. A screw shaft 37 fixed to carriage 31 is received within female screw 36 in order to translate carriage 31 in the radial direction as female screw 36 rotates.

Figure 2:
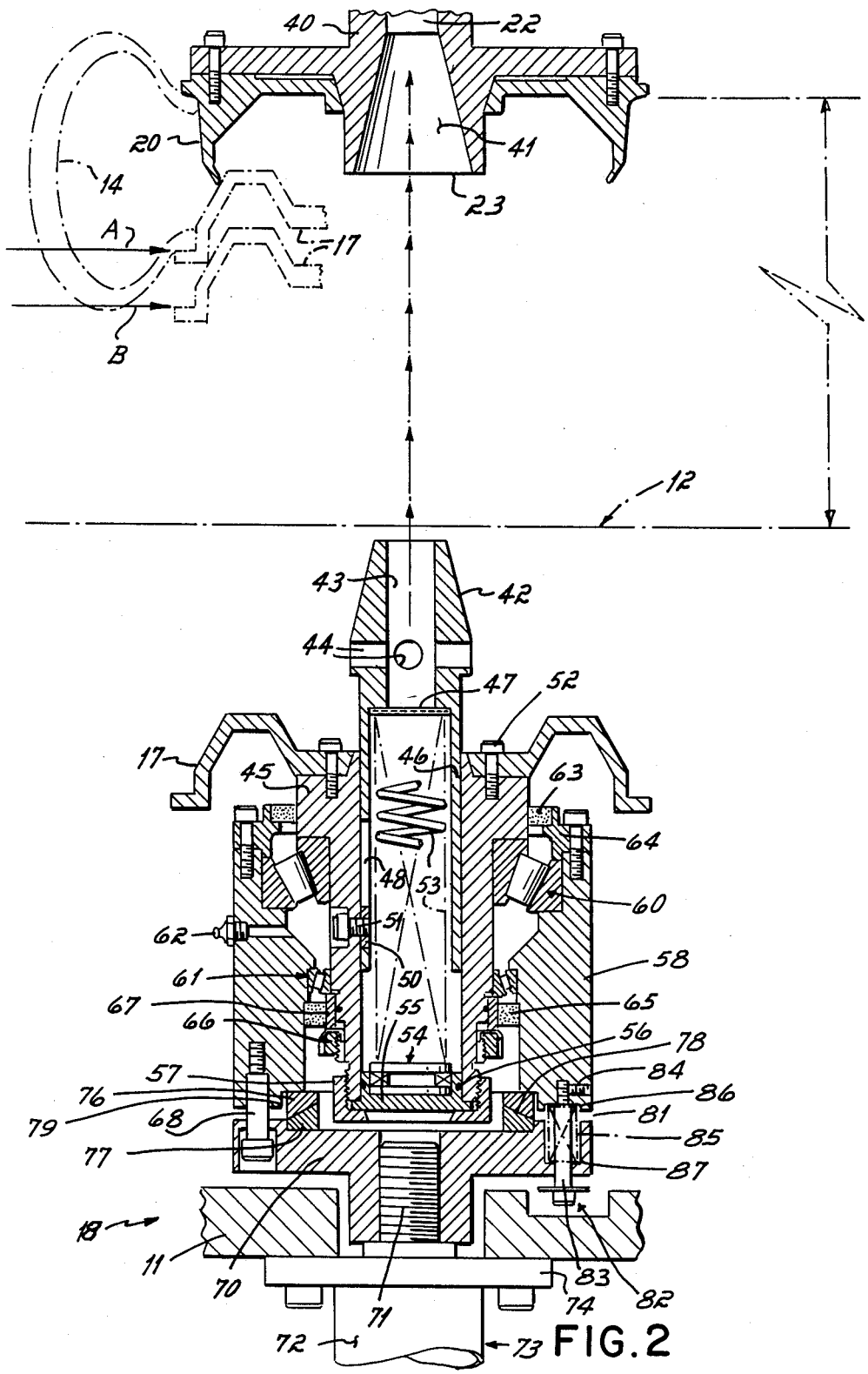

Referring to FIG. 2, the upper rim 20 is mounted on an adaptor 40 that is secured to the drive pulley 24 (FIG. 1). The air passage or central bore 22 provides a conical recess or seat 41 to receive a slideable pilot or nose cone 42 on the lower half rim or chuck 17. Cone 42 includes an axial bore 43 which mates with air passage bore 22 when nose cone 42 engages seat 41 to provide a path for tire inflation air which is supplied to the interior of tire 14 by way of radial ports 44 which intersect bore 43. The cone 42 is vertically slideable in a lower spindle 45. The cone has a hollow shank 46 that is located in the lower spindle 45. The upper end of shank 46 is ported to bore 43 by way of a felt filter 47. This provides for substantially equal pressures within the interior of shank 46 as compared to the air passageway defined by bores 22, 43 and ports 44 to avoid nose cone 42 from being forced by inflation air pressure.

A longitudinal slot 48 is formed in shank 46 to form a keyway. An internally threaded key 50 is secured within keyway 48 by a set screw 51 counterbored within lower spindle 45. Key 50 and keyway 48 permit cone 42 to slide or reciprocate axially with respect to spindle 45 but preclude rotation of cone 42 with respect to spindle 45. Thus, the rotary force imparted to the upper rim 20 is transmitted to cone 42 and through the key 50 and keyway 48 to the spindle 45. Key 50 further serves to limit the axial travel of shank 46 to retain it within spindle 45.

The lower rim 17 is secured by means of removable bolts 52 to the spindle 45. A helical compression spring 53 is located inside shank 46 and has an upper end that bears against the inner surface of cone 42 via filter 47 and a lower end which bears against trust bearing 54. In the apparatus constructed by Applicants, spring 53 is part no. 9-4048-21 manufactured by Danly Machine Corp. of Chicago, Ill. Spring 53 has a free length of approximately 12 inches and an outside diameter of about 2½ inches. When spring 53 is at a length corresponding to full extension of shank 46 from spindle 45 as retained by key 50, spring 53 should exert a force of about 400 to 500 pounds and about 800 pounds when shank 46 is fully retracted in spindle 45. Bearing 54 relieves the rotational stress imparted to the spring as it changes its length, thus avoiding the scoring of the bottom of the spindle as well as undue wearing of key 50 and keyway 48.

Bearing 54 is retained in engagement with spring 53 by means of a cap 55 provided with an internal O-ring 56 to prevent leakage of tire inflation air. Cap 55 is secured by means of a threaded retainer 57 which engages a threaded land on the exterior of the base of spindle 45.

Spindle 45 is mounted for rotation within a housing 58 by means of an upper tapered roller bearing 60 and a lower tapered roller bearing 61. A grease nipple 62 disposed on housing 58 at a location between bearings 60 and 61 is used to supply a suitable lubricant to both. Lubricant is maintained in the area of bearings 60 and 61 by means of an upper seal 63 mounted within an adaptor 64 bolted to housing 58 and by a lower seal 65. Adjustment of lower bearing 61 may be accomplished by means of a lock nut and lock washer 66 which is threaded onto annular land on the outside of spindle 45 near the lower end thereof. Lock nut 66 acts on the inner race of bearing 61 through mutual engagement with a spacer ring 67 disposed between housing 58 and seal 65.

The housing 58 is secured by bolts 68 to an adaptor 70 that is threaded on the upper end of a piston rod 71 attached to a piston 75 (FIG. 1) slideable in a cylinder 72 of a hydraulic actuator 73 which is preferably a Model MF-5 manufactured by the Schrader Bellows Division of Parker-Hannefin. Cylinder 72 has a 4 inch diameter bore and the diameter of rod 71 is 2.50 inches. The upper end of actuator 73 has a mounting flange 74 that is secured to the frame 11.

Actuator 73 has a stroke of about 20″ to move the rim 17 from the position shown in full lines to the position shown by phantom lines in FIG. 2. When the rod 71 is fully extended, the cone 42 seats in the recess 41 and bottoms out in the spindle 45. The force applied by the piston and cylinder is of the order of tens of thousands of pounds which is sufficient to pulverize any common dirt particles from tire grinding dirt captured between the cone 42 and the recess 41, so the two may seat accurately and on center. Thus, the tire beads are held, through the resilience of the tire, snugly against the rims so that when the inflation air is introduced, a good seat is rapidly and effectively attained.

To further insure that lower rim 17 centers axially with respect to upper rim 20 and that rims 17 and 20 are disposed in substantially parallel planes when cone 42 engages seat 41, the following improvements assist the mating tapers of nose cone 42 and seat 41 in determining proper alignment. A pair of washers 76 and 77 having mating spherical concave and convex surfaces respectively indicated at 78 are interposed between housing 58 and adapter 70 respectively. This permits the structure associated with housing 58, including nose cone 42, to pivot axially somewhat about the entire 360 degree circumference of washers 76 and 77 thereby permitting nose cone 42 to freely seek center within seat 41. To allow for some lateral motion of housing 58 with respect to washers 76 and 77, the seat in housing 58 which receives washer 76 is slightly laterally oversized as shown by the annular space 79.

To allow pivoting of housing 58 relative adapter 70, washers 76 and 77 provide a gap 81 between housing 58 and adapter 70, the width of which is about ⅜ of an inch when shank 46 is fully bottomed out within spindle 45.

To secure housing 58 to adapter 70 while permitting relative motion therebetween, bolts 68 float within their respective counterbores in adapter 70. Further, three similar sets of spring loaded fastener assemblies 82 are disposed at 120 degree intervals between bolts 68 of which there are also three. Each assembly 82 includes a cap screw 83 of slightly excess length as shown. Traversing adapter 70 extending across gap 81 and penetrating housing 58 wherein screw 83 is preferably secured by means of a dog pointed set screw 84. A spring 85 surrounds each screw 83 and is captured within opposed seats 86 and 87 provided in housing 58 and adapter 70 respectively. Springs 85 act to unload spherical washers 76 and 77 to assist in maintaining relative free movement therebetween for proper centering.

An LVDT 88 is mechanically connected between the adaptor 70 and the frame 11. Its function is to produce an electrical signal that is the measure of the vertical distance between the lower rim 17 and the upper rim 20.

As previously noted, hydraulic actuator 73 (FIG. 1) includes a piston 75 which reciprocates within a cylinder 72. The top side 90 of piston 75 and the bottom side 91 of piston 75 are connected to a hydraulic servo-control system 92 which will now be described in further detail.

Control system 92 includes a high pressure fluid supply 93 and a low pressure, high volume fluid supply 94. High pressure supply 93 is at a nominal pressure of 2000 psi, while low pressure supply 94 is at a nominal pressure of 1000 psi and is capable of supplying fluid at a rate of about 25 gpm. A valve 96 has a first input port 97 connected to low pressure high volume supply 94 and a second input port 100 connected to a hydraulic return 101. Valve 96 is a double acting 4 way, 3 position solenoid valve with spring return to center. Valve 96 further includes a first output port 102 connected by way of a flow control 103 to the top side 90 of piston 75. Valve 96 has a second output port 104 connected by way of a flow control 105 to the bottom side 91 of piston 75. A line incorporating a check valve 110 shunts the input 97 of valve 96 and the output of flow control 103 to provide regenerative action when piston 75 is raised.

High pressure supply 93 is connected to a 3 way, 2 position single acting solenoid valve 106 at a first input port 107 thereof. A second input port 108 of valve 106 is connected to a return 109. Valve 106 has a first output port 112 which is also connected to return 109 and a second output 113 which is connected by way of a check valve 114 and a 3 micron filter 115 to the pressure input of servo-valve 116 which is preferably a Part No. BD-15-25-N manufactured by Parker Hannefin. The input to filter 115 is further connected to low pressure supply 94 through a check valve 117 which prevents high pressure fluid from flowing into the low pressure system. Servo-valve 116 includes a return connection 118, a first output 119 connected to the bottom side 91 of actuator 73 and a second output 120 connected to the top side 90 of actuator 73. Servo-valve 116 is connected electrically by way of a control line 122 to a conventional servo-amplifier 123 having a set point input 124 and a control input 125 the latter of which receives a distance indication signal from LVDT 88. Set point input 124 is shown connected to a set point control potentiometer 126 whereby a desired bead width set point may be determined. Alternatively, a set point input 124 could receive approximate set point control signals from which signal may be varied according to the bead widths of individual tires being tested. The main control computer 130 of machine 10 includes, inter alia an input 131 from LVDT 88 from which it receives distance information as well as appropriate outputs 132 and 133 for actuating valve 96 to the right and left respectively and an output 134 for actuating valve 106.

In operation, piston 75 and rod 71 are initially in a fully retracted or home position as shown in FIG. 2. When a tire 14 to be tested is in position for mounting the main control computer 130 actuates valve 96 by way of output 132 to shift its spool to the right in the FIG. 1 to connect low pressure, high volume supply 94 to the underside 91 of piston 75 through flow control 105. This results in rapid upward movement of piston 75, the velocity of which is controlled by the setting of flow controls 103.

As lower rim 17 passes upward through the opening in conveyor 12, rim 17 engages the lower bead of tire 14 carrying tire 14 upward with it. The lower rim assembly 18 rises until nose cone 42 engages tapered seat 41 to center and insure parallelism of rims 17 and 20. This alignment is further assisted by spherical washers 76 and 77 which can pivot slightly about their mated spherical surfaces at 78 as well as shift laterally slightly if required in the seat in housing 58. The continued upward movement of piston 75 causes spring 53 to compress until shank 46 bottoms out briefly in spindle 45 thereby driving nose cone with a high force into seat 41. This tends to pulverize any particulates trapped in seat 41 which might otherwise interfere with proper centering of nose cone 42 and lower rim 17. At this point the lower rim 17 is indicated at A in FIG. 2.

In this location, the spacing between rims 17 and 20 as sensed by LVDT 88 and indicated by the signal appearing at input 125 of amplifier 123 is narrower than the desired bead width as indicated by the set point signal applied at input 124 of servo amp 123 as determined by the setting of potentiometer 126. Accordingly, a large position error signal is generated by amp 123 on line 122. Servovalve 116 then assumes control and, in response to the error signal on line 122, supplies fluid from port 120 to the top side 90 of piston 75 and receives fluid into port 119 from the underside 91 of piston 75 to begin to move lower rim 17 downward. About the same time, while lower rim 17 is still at or near position A, the main unit controller 120 initiates inflation of tire 14 by flowing air through passage 22 and outward from ports 44 into the area between rims 17 and 20. Because the upper bead of tire 14 is seating on or at least a reduced distance from upper rim 20, pressurization of tire 14 while lower rim 17 is so located provides more reliable seating of the upper bead of tire 14 upon rim 20.

Lower rim 17 continues to move downward as tire 14 is inflated. As rim 17 approaches the desired bead width set by potentiometer 126, as indicated by position B in FIG. 2, controller 130 energizes valve 106 by way of line 134 to connect high pressure supply 93 to the pressure input of servovalve 116 through filter 115 and deenergizes valve 96 which reassumes its center, blocked position. Lower rim 17 reaches position B which corresponds to a desired bead width appropriate for tire 14 and is maintained there under the continuous closed loop control of system 92 while tire testing proceeds.

As is well known in the art, testing includes driving carriage 31 radially inward until the surface 28 of loadwheel 27 engages the tread surface of tire 14 which is rotatably driven by motive force supplied by motor 25 through belt 26 to upper rim spindle 21 and through adapter 40 to upper rim 20. Due to the force applied by spring 53, tapered seat 41 is securely frictionally coupled to nose cone 42 to drive lower rim 17 with upper rim 20 without significant rotational slip between the two rims. During testing, forces transmitted by the rotating tire 14 to loadwheel are picked up by sensors (not shown) and analyzed by computing means (also not shown) to characterize the uniformity of construction of tire 14.

At the conclusion of testing, tire 14 is deflated and high pressure is removed from actuator 73 and controller 130 deactivates valve 106 allowing its spring to return its spool to its normal, recirculating position. Valve 96 is then energized via line 133 to move its spool to the left as shown in FIG. 1, thereby connecting the top side 90 of piston 75 to low pressure high volume supply 94 through flow control 103 and connecting the bottom side 91 of piston 75 to return 101 through flow control 105. This effects a rapid downward movement of piston 75 to its initial or home position at a velocity which be adjusted by way of flow controls 103 and 105.

While the invention has been described as applied to a tire uniformity inspection machine it is to be understood that the invention is not limited to use in such equipment. To the contrary, the invention may be applied to great advantage in other applications wherein it is necessary to chuck a tire. It is to be further understood that the invention is not limited to the exact form shown and described above which are illustrative of a preferred embodiment of the invention. In view of the present disclosure those having skill in this art will be able to imagine various changes and modifications which can be made without departing from the spirit and scope of the invention as particularly pointed out and distinctly claimed in the appended claims.

What is claimed is:

1. In a tire testing machine having an axially-fixed rotatable upper rim, a rotatable lower rim located below said upper rim and means for positioning a tire between said rims, apparatus for positioning the lower rim with respect to the upper rim to the required bead width, comprising:
   means for raising said lower rim until the space between said upper and lower rims is less than the required bead width,
   means for inflating a tire between said rims while said lower rim is in the raised position to set the beads on the rims, and
   means for lowering said lower rim to the required bead width while said tire is inflated.

2. Positioning apparatus as in claim 1 further comprising:
   a conical recess in the center of said upper rim,
   a cone slideably mounted to the center of said lower rim and engageable with said recess to align said rims,
   a spring maintaining said cone tightly in said recess to enable torque from said upper rim to be transmitted to said lower rim,
   and means for rotating said upper rim.

3. Positioning apparatus as in claim 2 in which said spring force is at least about 400 pounds.

4. Positioning apparatus as in claim 1 in which said raising and lowering means comprises:
   a hydraulic piston and cylinder connected to said lower rim,
   means for measuring the axial position of said lower rim with respect to said upper rim,
   hydraulic circuit means connected to said measuring means for raising said lower rim to its full extent and thereafter lowering said rim to the desired bead width as measured by said measuring means.

5. In a tire testing machine having a frame, an axially-fixed rotatable upper rim, means for rotating said upper rim, a rotatable lower rim located below said upper rim, and means for positioning a tire between said rims, apparatus for positioning the lower rim with respect to the upper rim to the required bead width comprising:
   a lower spindle housing,
   means connected between said frame and said spindle housing for raising and lowering said housing,
   a spindle rotatably mounted in said housing, said lower rim being mounted on said spindle,
   a centering cone axially slideably mounted in the center of said housing and engageable with the center of said upper rim when said housing is raised, and a spring urging said cone toward said upper rim.

6. Apparatus as in claim 5 in which said spring is a helical spring having an upper end contacting said cone, and a bearing between the lower end of said spring and said housing.

7. Apparatus as in claim 5 further comprising:
axial slot and key means between said cone and said housing to permit axial movement of said cone while permitting no rotary movement of said cone with respect to said housing.

8. Apparatus as in claim 5 in which said raising and lowering means is a hydraulic piston and cylinder.

9. Apparatus as in claim 5 in which said raising and lowering means is a ball screw connected between said frame and said housing.

10. An adjustable width chuck for holding tires of different bead widths, said chuck comprising:
a first half rim and an opposed second half rim, each of said half rims being adapted to retain a bead of a tire;
an actuator connected to at least one of said half rims for selectively closing the chuck to a tire-holding position by moving said half rims together and opening the chuck to a tire-releasing position by moving said half rims apart;
pilot means connected to said second half rim and being telescopically-extendable in the direction of said first rim over a range of distances;
biasing means operably disposed between said pilot means and said actuator so that upon closing of the chuck, said pilot means engages said first half rim and resists the closing force applied by said actuator with a lesser force sufficient to insure centering of said half rims and to separate said half rims by a distance appropriate to the bead width of a tire.

11. A method of chucking a pneumatic tire, comprising the steps of:
interposing the tire between a first rim for receiving one bead of the tire and a second rim for receiving the opposite bead of the tire;
positioning said rims to a first axial spacing therebetween;
flowing air into the tire to seat each of said beads upon its respective rim and at least partially inflate the tire, and
repositioning said rims while the tire is inflated to a second axial spacing wider than said first axial spacing.

12. The method of claim 11 further comprising the step of maintaining said second axial spacing during testing of the tire.

13. The method of claim 11 further comprising the step of driveably coupling said first half rim and said second half rim.

14. The method of claim 11 wherein said first axial spacing is narrower than the normal bead width of the tire.

15. The method of claim 11 wherein said second axial spacing corresponds to the normal bead width of the tire.

16. An adjustable width chuck for holding tires of different bead widths, said chuck comprising:
a first half rim and an opposed second half rim, each of said half rims having a circumferential lip adapted to retain the bead of a tire;
an actuator connected to at least one of said half rims for selectively closing the chuck to a tire-holding position by moving said half rims together and opening the chuck to a tire-releasing position by moving said rim halves apart;
telescoping pilot means connected to at least one of said half rims and disposed at least partially between said first half rim and said second half rim,
biasing means operably disposed between said pilot means and said actuator means to cause said pilot means to tend to separate said half rims when the chuck is in said tire-holding position; and
actuator control means operably connected between at least one of said half rims and said actuator to sense the distance between said half rims and to modulate the effort exerted by said actuator means upon closing the chuck to allow said pilot means and said biasing means to separate the half rims by a distance appropriate to the bead width of a tire.

* * * * *